Jan. 18, 1927.
T. G. MEDDERS
1,614,624
COTTON CLEANER
Filed Sept. 11, 1925
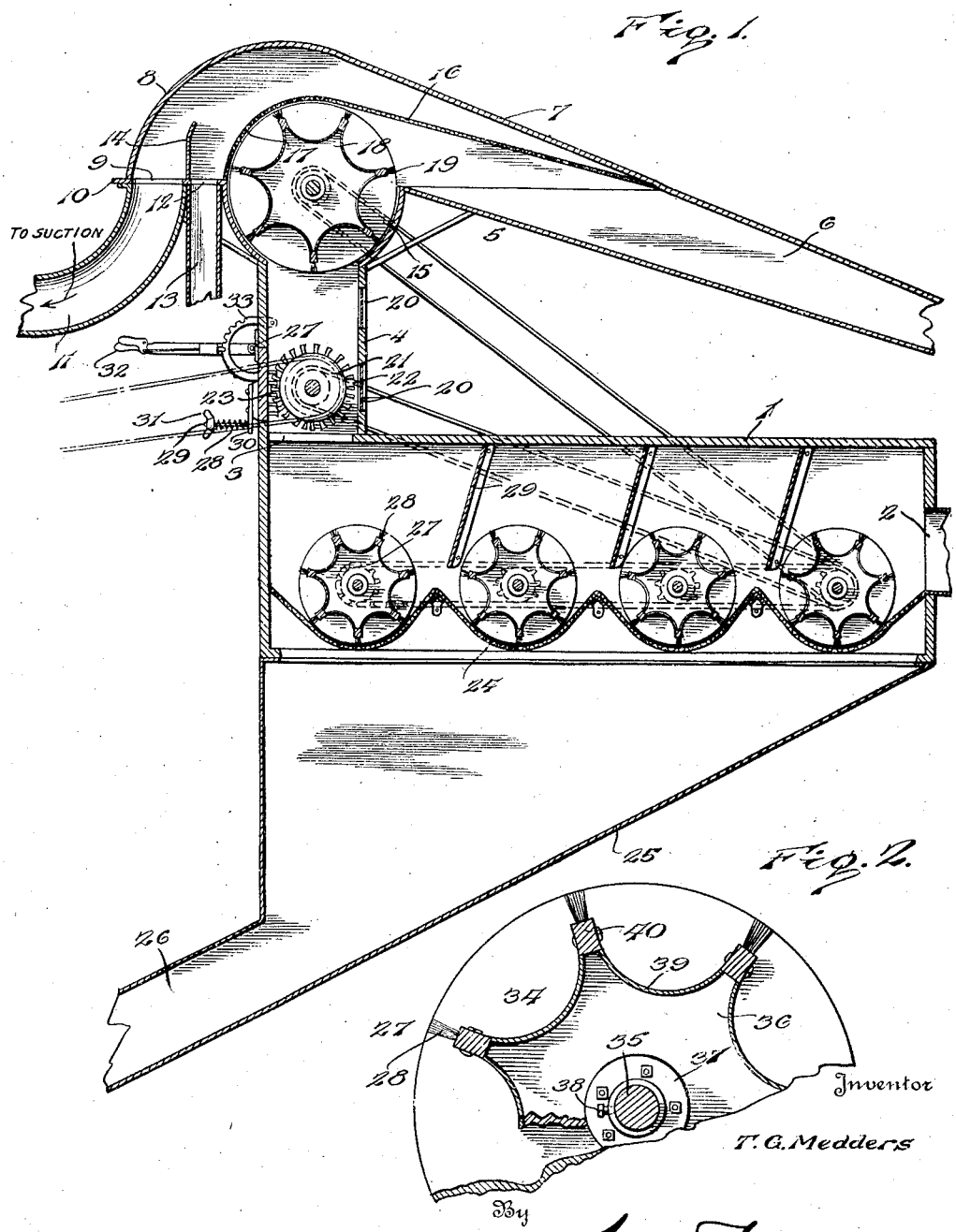

Patented Jan. 18, 1927.

1,614,624

UNITED STATES PATENT OFFICE.

THOMAS G. MEDDERS, OF LAMESA, TEXAS.

COTTON CLEANER.

Application filed September 11, 1925. Serial No. 55,795.

This invention relates to cotton cleaners and has for its object to provide an efficient mechanism whereby cotton may be cleaned and relieved of all dirt and foreign matter before delivery to a gin and when delivered will be in a better commercial condition than has been heretofore possible, enabling the cotton grower to obtain a better price for his product and effecting an economy in the operation of the gin. The invention provides an apparatus whereby the cotton will be relieved of all the dirt and trash and will be delivered in a light fluffy condition without injuring the cotton locks. The invention is illustrated in the accompanying drawing and will be hereinafter fully described, the novel features being particularly pointed out in the appended claims.

In the drawing:

Figure 1 is a vertical longitudinal section of one embodiment of my invention, and Fig. 2 is an enlarged detail section.

In carrying out the invention, I provide a lower housing 1 from which the cleaned cotton is discharged through an outlet opening 2 and into which it is fed through an inlet 3, being brought to said inlet through a vertically disposed conduit 4 receiving it from an upper housing 5 within which is mechanism for effecting an initial cleaning of the cotton and removal therefrom of sand and other impurities.

The upper housing 5 comprises an intake conduit 6, the other end of which may be disposed over a wagon or other cotton-containing receptacle, and the inner upper end of which is connected with a hood 7 secured thereon in any convenient manner. This hood 7 extends from the intake conduit 6 in substantially axial alinement therewith and is extended laterally to provide a downwardly curved terminal 8. The downturned curved terminal 8 of the hood covers an opening 9 in an extension flange or plate 10 of the intake conduit and which opening communicates directly with a tube 11 leading to a suction fan (not shown). Another opening 12 is provided in the extension 10, and this opening is in direct communication with the upper end of an outlet spout 13 through which sand and trash may be carried off to a place of deposit, a deflecting partition 14 rising from the extension 10 between the openings 9 and 12, as clearly shown. Between the end of the intake conduit 6 and the said extension 10, a substantially semi-cylindrical chamber 15 is provided, which chamber extends across the upper end of and is in direct communication with the vertical conduit 4. The hood 7, of course, extends over the end of the intake conduit 6, the chamber 15 and the openings 9 and 12, and a screen 16, preferably of wire mesh netting, is secured within the hood in any convenient manner so as to extend obliquely across the path of the cotton drawn through the conduit 6 and merge through a downturned curved portion 17 into the rear wall of the chamber 15. Mounted concentrically within the space defined by the chamber 15 and the curved portion 17 of the screen 16 is a rotatable brush 18 which may be of any convenient construction and is provided upon its circumference with longitudinal rows of brushes 19 which are adapted to ride upon the surface of the screen 16 and over the walls of the chamber 15, as will be readily understood upon reference to the drawing.

The vertical conduit 4 is provided in one wall with sight openings 20 which may be glazed or fitted with screens, as preferred, so that a view of the cotton passing through said conduit may be had. In the lower end of this vertical conduit 4 is mounted a breaking cylinder 21 which is provided with teeth or projections 22 covering its entire circumference to cooperate with concaves 23 mounted in the opposite wall of the conduit. The lower main housing 1 is elongated, the inlet 3 thereof being provided in its top adjacent one end and the outlet 2 being provided in the vertical wall at the opposite end. The said housing or casing is equipped with an internal screen 24 extending the entire length thereof and formed into a series of substantially semi-cylindrical sections, the housing below the said screen being unobstructed and provided with an inclined bottom 25 leading directly into and forming a part of a discharge chute 26. Mounted within the housing above and concentric with the several sections of the screen 24 are brushing drums 27 provided with longitudinal rows of brushes 28 upon their circumferences and between each two brushes a guard or retarding plate 29 is secured within the housing in any convenient or preferred manner.

The concave 23 is hinged to the conduit 4, as indicated at 27, and is yieldably held to the breaking cylinder by a spring 28 supported by a bolt 20 which projects from the conduit 4 through a lug 30 on the concave, the spring bearing between the lug and the nut 31 on the bolt in an obvious manner. When cleaning picked cotton, the concave may be held away from the breaking cylinder by properly setting a hand lever 32 which is fixed to the concave at the hinge thereof and is equipped with the detent engaging the rack 33.

The brush 18 and the brushing drums 27 are of like construction. Referring to Fig. 2, there is shown a wooden disk 34, one of which is secured to each end of the brush shaft 35. At the inner side of each disk 34 and at intervals along the shaft there are smaller disks 36 having their edges scalloped or notched, all the disks having collars or hubs 37 bolted to their sides and each secured to the shaft by a set screw 38. Seated in the notches or scallops of the disks 36 and secured to the disks in any preferred manner are sheet metal plates 39, sticks 40, constituting the heads of the brushes 28, being secured to and between the edges of adjacent plates.

I have indicated chain or belt gearing for driving the several working parts but any preferred gearing may be used.

It is thought the operation of my improved cotton cleaner will be readily understood from the foregoing description, taken in connection with the accompanying drawing. When cotton is to be cleaned, the suction fan (not shown) is set in motion so that suction will be created through the intake conduit 6 and the tube 11 whereby cotton will be drawn through the said tube 6 into contact with the screen 16, the sand and like impurities being sucked through the screen while the cotton will be stopped by it so that it will be engaged by the rotating brush or drum 18 and thereby delivered into the vertical conduit 4. The sand passing through the screen 16 will impinge against the deflector 14 and will be thereby directed into the outlet pipe 13 to be discharged upon the ground or otherwise disposed of, the passage of such material to the fan and consequent wear upon the fan being prevented. The drum 18 riding upon the under surface of the screen 16 and upon the inner surfaces of the walls of the chamber 15 will positively engage the cotton and deposit it in the vertical conduit 4 through which it will drop to the breaker cylinder 21. The said cylinder, cooperating with the concave 23, will break up the cotton bolls and will loosen the dirt and trash which may be commingling with the cotton so that, when the cotton enters the cleaning chamber in the upper portion of the housing 1, it will be in condition to be efficiently acted upon by the several cleaning drums 27. Dropping into the said cleaning chamber, the cotton will be at once engaged by the first cleaning drum which will roll it over the screen 24 below the same and deliver it into the next semi-cylindrical or arcuate section of the screen to be there acted upon by the cooperating drum. The guard 29 will catch the cotton kicked upwardly by the cleaning drum and will direct the said cotton back to the screen so that it will be prevented from passing over the succeeding drum. All the cotton, consequently, will pass over all the screen sections and be acted upon by all the drums, uniform quality in the product being thus attained. The several cleaning drums will roll the cotton over the cooperating portions of the screen 24 and will thoroughly clean the cotton, the dirt and trash passing through the screen into the space below the same and escaping through the discharge chute 26 in an obvious manner, and the chute may be arranged to carry the trash outside the building or upon a conveyer within the building. It will be noted that in my machine there are employed a series of brushing cylinders or drums which will brush and fan the cotton over a cooperating screen so that the dirt and trash will be brushed and fanned out of the cotton and will not be beaten therefrom as in prior machines. The brushes will serve to dry wet cotton and will extract the dirt and trash but leave the locks of cotton whole so that the staple is not injured but the grade of the cotton is improved inasmuch as it is rendered light and fluffy and is in much better condition for the gin saws to handle than has been possible with machines heretofore employed. The construction is also such that the danger of seed cotton fires is practically eliminated. The deflector in the upper hood constitutes a sand trap so that all the loose sand will be dropped through the outlet 13 instead of passing to the suction fan and causing wear thereon which necessitates frequent repairs. While all the working parts are enclosed, they are easily accessible when repairs are necessary and the cotton is discharged through the outlet 2 into a distributer or elevator or other receptacle in such condition that the gins will produce a longer and better staple than heretofore without napping the lint cotton.

Having thus described the invention, I claim:

1. A cotton cleaner comprising an intake conduit, means for creating a suction through the conduit, a screen extending across the conduit to separate dirt from the cotton, a brushing drum working in the conduit and in contact with the under surface of the screen to deliver the cotton below the conduit, and a deflector adjacent and in spaced relation to the upper side of the screen to arrest the dirt passing through the screen.

2. A cotton cleaner comprising a housing including an intake conduit, a hood extending over the housing and the conduit, a screen within the hood extending across the conduit, a suction opening at the discharge end of the hood, an outlet opening between the suction opening and the screen, and a deflector rising within the hood between the suction and outlet openings.

3. A cotton cleaner comprising an inlet, a breaking chamber below the inlet, a cleaning chamber below and in communication with the breaking chamber, a screen extending longitudinally through the cleaning chamber and constituting the bottom of the same, and a plurality of cleaning drums rotatably mounted above the said screen to brush cotton along and over the screen, said drums each consisting of a plurality of longitudinal brushes arranged to ride upon the adjacent screen and concave plates bridging the spaces between the brushes.

In testimony whereof I affix my signature.

THOMAS G. MEDDERS. [L. S.]